United States Patent
Mizue et al.

(10) Patent No.: US 7,201,520 B2
(45) Date of Patent: Apr. 10, 2007

(54) OPTICAL MODULE HAVING A SIMPLE MECHANISM FOR RELEASING FROM A CAGE

(75) Inventors: Toshio Mizue, Kanagawa (JP); Manabu Ishikawa, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/854,208

(22) Filed: May 27, 2004

(65) Prior Publication Data

US 2005/0018979 A1 Jan. 27, 2005

(30) Foreign Application Priority Data

May 30, 2003 (JP) .............................. 2003-155456
Sep. 19, 2003 (JP) .............................. 2003-329102

(51) Int. Cl.
*G02B 6/36* (2006.01)
(52) U.S. Cl. ...................................................... 385/92
(58) Field of Classification Search .................. 385/92
See application file for complete search history.

(56) References Cited

U.S. PATENT DOCUMENTS

| | | | |
|---|---|---|---|
| 6,439,918 B1 | 8/2002 | Togami et al. | |
| 6,447,170 B1 * | 9/2002 | Takahashi et al. | ............ 385/53 |
| 6,556,446 B1 * | 4/2003 | Hwang | ........................ 361/728 |
| 6,744,963 B2 | 6/2004 | Hwang | |
| 6,786,653 B1 * | 9/2004 | Hwang et al. | ................. 385/92 |
| 2003/0002823 A1 * | 1/2003 | Wu | .............................. 385/92 |
| 2003/0072539 A1 * | 4/2003 | Huang et al. | ................. 385/92 |
| 2003/0072540 A1 * | 4/2003 | Huang | .......................... 385/92 |
| 2003/0171022 A1 * | 9/2003 | Distad et al. | ............... 439/372 |
| 2004/0008954 A1 * | 1/2004 | Shaw et al. | .................... 385/92 |
| 2004/0033030 A1 * | 2/2004 | Ohbayashi et al. | ........... 385/88 |
| 2004/0062493 A1 * | 4/2004 | Ishigami et al. | ............... 385/92 |
| 2004/0105239 A1 * | 6/2004 | Chiang | ........................ 361/728 |
| 2004/0197055 A1 * | 10/2004 | Fischer et al. | ................. 385/92 |
| 2004/0197056 A1 * | 10/2004 | Oki | .............................. 385/92 |
| 2005/0100292 A1 * | 5/2005 | Malagrino, Jr. | ............... 385/92 |
| 2005/0117854 A1 * | 6/2005 | Chiu et al. | ..................... 385/92 |

* cited by examiner

*Primary Examiner*—Ellen E. Kim
(74) *Attorney, Agent, or Firm*—Venable LLP; Michael A. Sartori

(57) ABSTRACT

The present invention provides an optical module having a pluggable configuration, which enables to latch with the cage when the optical connector is mated with the receptacle. The optical module of the present invention is secured in the cage by latching the latch of the cage and the projection of the module. The actuator of the module, having a slab protruding into the optical receptacle, is able to slide along the direction the module is inserted into the cage. When the optical connector is in the optical receptacle, the slab of the actuator butts the optical connector and is prohibited to slide, accordingly, the optical module can not released from the cage.

9 Claims, 12 Drawing Sheets

OPTICAL MODULE HAVING A SIMPLE MECHANISM FOR RELEASING FROM A CAGE

BACKGROUND OF THE INVENTION

1. Field of the Invention

This invention relates to an optical module, especially, an optical module having a hot-pluggable function.

2. Related Prior Art

Optical modules having a hot-pluggable function are plugged in the cage and electrically coupled with the connector disposed on the host board. Various types of pluggable module are well known in the field. One has been disclosed in the U.S. Pat. No. 6,439,918. That is, the module disclosed in the '918 patent includes an optical receptacle for receiving the optical connector, a block having a latching/releasing mechanism, and a bail for leading the releasing action.

That is, the block includes a hook in one end thereof and a groove for receiving a portion of the bail therein. The hook latches with the slot in the cage, whereby the optical module is secured and fixed within the cage. When rotating the bail by the portion put in the groove as the center, the hook, linking with the motion of the bail, changes its hooking position with the cage. Accordingly, the optical module may be released from the cage. In the state that the optical connector is mated with the optical receptacle of the module, the bail can not rotate, accordingly, the optical module can not released from the cage.

SUMMARY OF THE INVENTION

One object of the present invention is to provide an optical module, which realizes the pluggable function with a simple and reliable structure.

According to one aspect of the present invention, on optical module to be mated with an optical connector, and is plugged in a space of a cage mounted on a host board is claimed. The cage has a resilient latch extending from the cage and protruding into the space. The optical module comprises an optical sub-assembly that includes an optical device, such as semiconductor laser diode or semiconductor photodiode, a housing, an receptacle body, and an actuator. The housing includes a projection butted to the latch when the optical module is plugged in the cage. The receptacle body, one end of which includes a receptacle for mating with the optical connector and the other end of which installs the optical sub-assembly. Accordingly, the optical device in the optical sub-assembly optically couples with the optical connector within the receptacle body. The actuator may be slide between the first position and the second position. At second position, the actuator presses the latch provided in the cage outward from the space. Accordingly, the hooking mechanism between the latch of the cage and the projection provided in the housing may be unfastened at the second position of the actuator, thereby releasing the optical module from the cage.

The actuator may include a pair of arms, each has an end portion, and a center portion connecting respective arms. The end portion widens in their span with relative to the length of the center portion. Accordingly, the actuator may press outward the resilient latch provided in the cage.

The housing may has a groove for receiving the arm of the actuator. The arm may slide in the groove. Further, the projection provided in the housing may be disposed within the groove and the end portion of the arm may be forked such that the projection of the housing is but between the forked end portion of the arm.

The housing may include an upper body and a lower body. Both bodies have a pair of said walls. The side walls of the lower body covers the side walls of the upper body. Moreover, the side wall of the upper body provides the groove and the projection, while the side wall of the lower body provides an opening. The resilient latch of the cage may butt against the projection provided in the upper body by passing through the opening provided in the lower body. The arms of the actuator may be disposed between the side wall of the upper body and the side wall of the lower body.

The center portion of the actuator may provide a flange and the receptacle body may provide an opening for passing the flange of the actuator into the receptacle. When the optical connector is mated with the receptacle body, the flange of the actuator may butt against the optical connector, whereby the actuator is prevented to slide from the first position to the second position.

The optical module of the present invention may further comprise a bail for sliding the actuator, and the lower body of the housing provides a slot, the bail couples to the actuator therethrough. The first position of the actuator corresponds to that the bail is positioned in one end of the slot, and the second position of the actuator corresponds to that that bail is positioned in the other end of the slot.

In another configuration of the actuator and the bail, the actuator may further includes a pair of front side walls, each extending from the arm of the actuator with a span therebetween being greater than the length of the center portion of the actuator. The bail may be positioned inside of the front side walls of the actuator.

The housing may include a projection and the bail may include a hole mating with the projection of the housing. The bail may further include a projection and the actuator may include a slot for receiving the projection of the bail. In these configuration of the housing, the bail, and the actuator, the actuator may slide from the first position to the second position by moving the projection of the bail from an end of the slot of the actuator to a center thereof by pivoting the bail around the projection of the housing as the center thereof.

DETAILED DESCRIPTION OF PREFERRED EMBODIMENTS (First Embodiment)

An optical module 1 according to the first embodiment of the present invention will be described as referring to accompanying drawings. In the description and the drawings, the same symbols and numerals without overlapping explanations will refer same elements.

Figure 1:
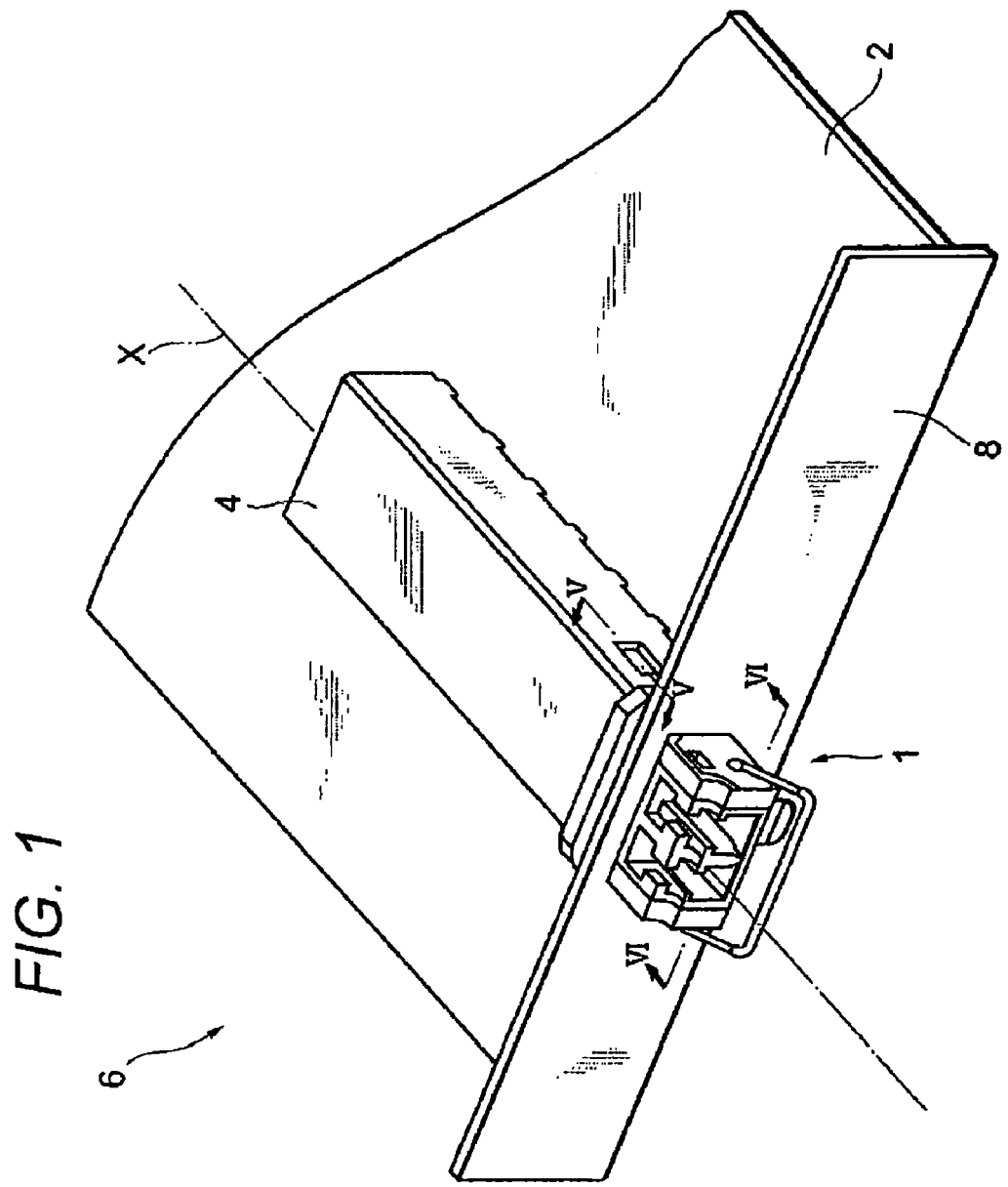
FIG. 1 is a perspective view showing an optical module plugged in the cage on the host board.
Figure 2:
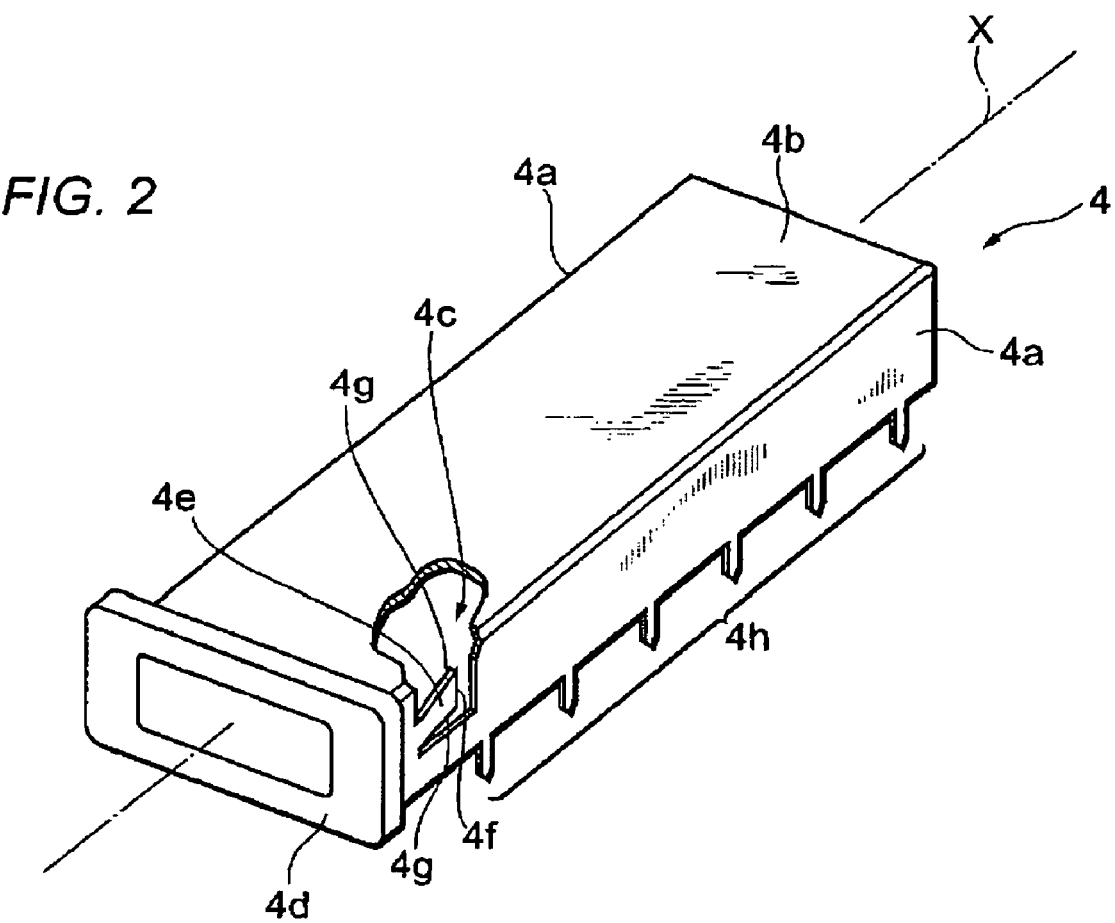
FIG. 2 is a partially cut out view of the cage to illustrate the latch.

FIG. 1 a perspective view showing the optical module 1 according to the present invention, a host board 2, and a cage 4 installed on the host board 2. FIG. 2 shows a cage 4a portion of which is broken to clarify the inside of the cage and the structure of the latch for hooking the optical module 1 to the cage 4. In the description, the upper/lower means the state where the cage 4 is assembled from the upper of the host board, namely, the state shown in FIG. 1. The front/rear means the direction to/from which the optical module 1 is inserted/released with respect to the cage 4.

The cage 4 has a pair of side walls 4a and an upper wall 4b, these walls forming a space 4c in which the optical module is received. The front end 4d of the cage 4 has an opening through which the optical module 1 is inserted into the space. This opening, as shown in FIG. 1, communicates with an opening formed in the face panel 8 of the host board 2.

Respective side walls include a latch 4e extending therefrom and protruding into the space 4c such that the edge thereof points to the rear. Further, the latch 4e may be resilient and bend toward the outside of the space 4c.

On the lower side of the cage is provided a plurality of pins 4h along the direction X with a span. By inserting respective pins into the via holes provided in the host board 2, the cage 4 is assembled in and fixed to the host board 4. Into the cage 4 thus assembled, the optical module 1 is inserted from the opening provided in the front end 4d of the cage 4.

Figure 3:
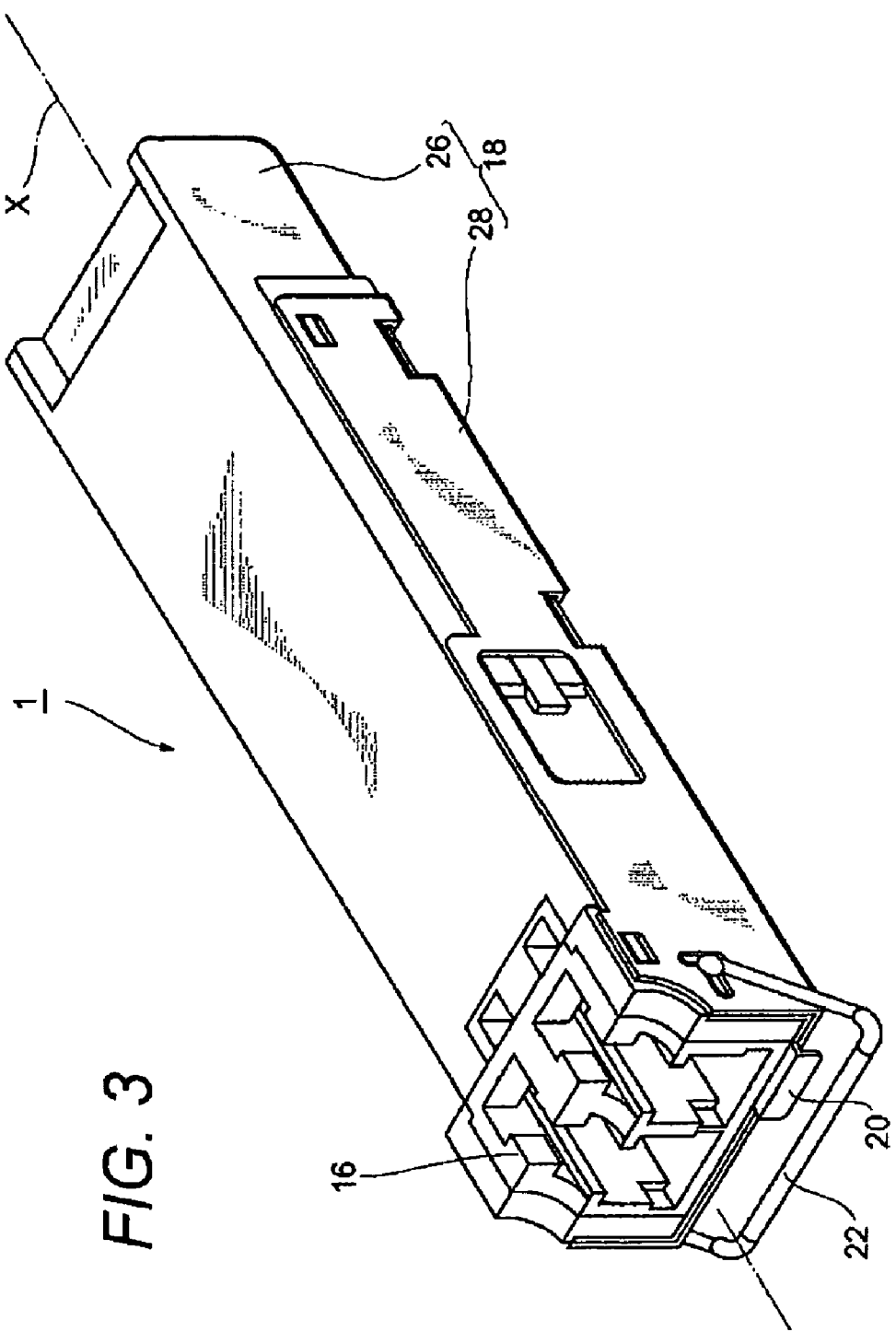
FIG. 3 is a perspective view of the optical module according to the first embodiment of the present invention.
Figure 4:
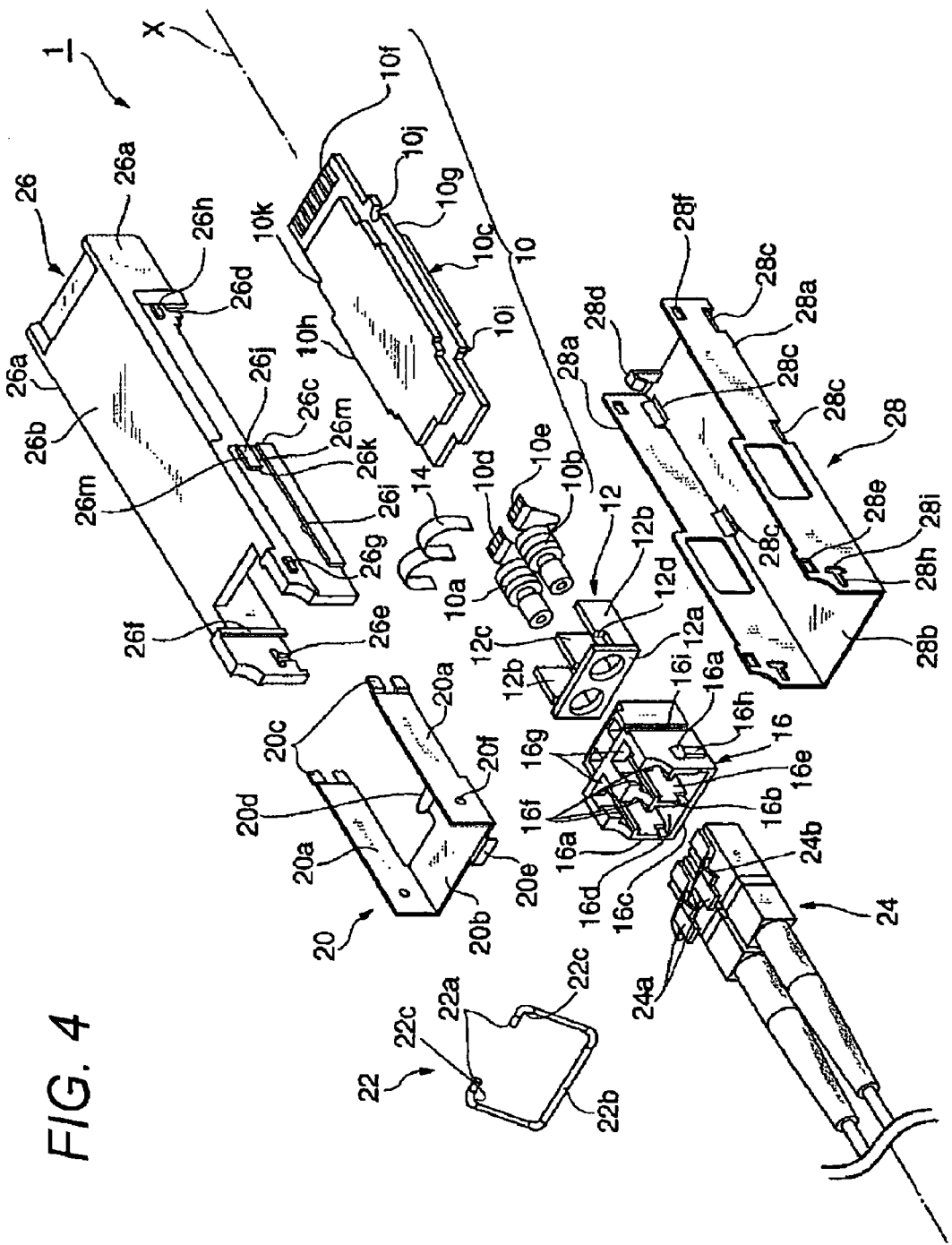
FIG. 4 is an exploded view of the optical module according to the first embodiment.

FIG. 3 is a perspective view, and FIG. 4 is an exploded view of the optical module 1 of the present invention. The optical module includes a primary unit 10, a holder 12, a bracket 14, a receptacle body 16, a housing 18, and actuator 20 and a bail 22. The housing comprises an upper body 26 and a lower body 28 communicating with the upper body and forming a space into which the primary unit 10 is received.

The primary unit 10 includes a semiconductor optical device. That is, the primary unit 10 includes a transmitting optical sub-assembly TOSA 10a, a receiving optical sub-assembly ROSA 10b, a substrate 10c, and wiring substrates 10d and 10e for connecting the TOSA 10a to the substrate 10c and the ROSA 10b to the substrate 10c, respectively.

The TOSA 10A includes a light-emitting device such as semiconductor laser diode, which emits light to a direction parallel to the axis X by supplying a signal via the wiring substrate 10d. In this embodiment, the wiring substrate is a flexible printed circuit, but another configuration such as lead pins may be applicable.

The ROSA 10B installs a light-receiving device such as photo diode, and outputs an electrical signal, which corresponds to an incident light along to the direction X, via the wiring substrate 10e to the substrate 10c. The wiring substrate 10e of the present embodiment is exemplified by a flexible printed circuit board, lead pins instead of the flexible printed circuit board may be applicable.

The substrate 10c extends along the axis X, one end of which is connected by the wiring substrates 10d and 10e. Other end of the wiring substrate 10d provides a edge plug 10f that electrically mates with an electrical connector not shown in FIG. 4 disposed on the mother board.

The TOSA 10A and the ROSA 10B are fixed to the OSA holder 12 by the bracket 14. The OSA holder 12 has a front wall 12a, a pair of side wall 12b, and a partition wall 12c which demarcates spaces where the TOSA and the ROSA are installed. The front wall 12a has two openings into which the head portion of the TOSA 10a and the ROSA 10b are inserted. The side wall 12b and the partition wall 12c has a cut 12d, into which the bracket 14 is inserted and thus the TOSA 10a and the ROSA 10b are fixed to the holder 12. The holder 12 is assembled with the receptacle body 16 with the TOSA 10a and the ROSA 10b being fixed thereto.

The receptacle body 16 has a pair of side wall 16a, a partition wall 16b, both extending along the axis X, and a bottom 16c supporting the side wall 16a and the partition wall 16b. These side wall, partition wall and the bottom form two receptacle 16d and 16c having two openings for receiving the optical connector 24. On the other end of the receptacle body 16, as previously described, is assembled by the holder 12 with the TOSA 10a and the ROSA 10b. That is, the other end of the receptacle 16d is inserted with the head of the TOSA 10a and that of the ROSA 10b, and thus the TOSA 10a and the ROSA 10b optically couple with the optical fiber secured in the optical connector 24 in the receptacle.

The receptacle body is preferably made of resin coated with nickel thereon, whereby the dimensional accuracy and the noise immunity of the receptacle body 16 can be enhanced. Another material, for example, zinc alloy may be applicable to the receptacle body 16.

Inner surface of the side wall 16a and the partition wall 16b of the receptacle body provides grooves 16f extending along the axis X. On the top of the receptacle body 16 has opening 16g so as to reach the grooves 16f. These grooves 16f and opening 16g are used for fixing the optical connector 24 within the receptacles 16d and 16e. The optical connector 24 has a latch 24a with a pair of hook on both side of the latch 24. The hook 24g protrudes from the latch 24a to a direction across the axis X. When the optical connector 24 is inserted in the receptacle 16d and 16e, the hook 24b passes along the groove 16f by pushing the latch 24a, and the connector 24 is fixed to the receptacle 16d and 16e by releasing the latch 24a at the position the hook 24b is in the opening 16g.

The housing 18 includes an upper body 26 and a lower body 28. The upper body 26 has a pair of side wall 26a and a top wall 26b connecting the side walls 26a. The upper body may be made of aluminum alloy, and may be coupled with the substrate 10c via a thermal sheet made of, for example, silicone. Thus, heat generated by devices mounted on the substrate 10c may effectively dissipate to the upper body and the ambient, accordingly, thermal stability of the optical module 1 can be enhanced.

The side wall 26a of the upper body 26 has a cut, and one end of the cut 26c is in contact with the step 10i of the substrate 10. While a projection provided in the other end of the cut fit with the cut 10*j* formed in the substrate 10*c*, thus the substrate 10*c* is fixed to the upper body 26.

The upper body also has a groove 26*e* and a beam 26*f*, both extending across the axis X, in the inner surface thereof. On the other hand, the outer surface of the side wall 16*a* of the receptacle body 16 provides another beam 16*h* and another groove 16*i*. By coupling the groove 26*e* of the upper body with the beam 16*h* and the beam 26*f* with the groove 16*i* with respect to each other, the receptacle body 16 is fixed and secured to the upper body 26.

The lower body 28 also has a pair of side wall 28*a* and a bottom wall 28*b* connecting the side walls 28*a*. When the lower body is assembled to the upper body 26, the side walls 28*a* thereof covers the side walls 26*a* of the upper body, and the substrate 10*c* is installed and secured in a space formed and sandwiched by upper and lower bodies.

The side wall 28*a* has leaf slabs 28*c* formed by bending a portion thereof, and other leaf slabs 28*d*, which is bent and formed from the bottom wall 28*b*, is formed in the end of the lower body 28. The leaf slabs 28*c* press the edges 10*g* and 10*h* of the substrate 10 to directions opposite to each other, and the other leaf slabs 28*d* press the step 10*k* formed in the substrate 10*c* to the front direction of the optical module 1. Thus, the substrate 10*c* is positioned and fixed to the lower body 28. The lower body 28 may be made of metal such as stainless steal and phosphor bronze to mechanically hold and electrically shield the substrate 10*c*.

The side wall 28*a* of the lower body 28 has holes 28*e* and 28*f* on both end portion thereof. A projection 26*g* provided in the outer surface 26*a* of the upper body 26 mates with one hole 28*e*, while the other projection 26*h* in the upper body 26 mates with the other hole 28*f*, thus the upper body 26 is fixed to the lower body 28.

In the outer surface 26*a* of the upper body provides a groove 26*i* extending along the axis X for receiving the actuator 20. The groove 26*i* has a projection 26*j* in the rear end thereof. The projection 26*j* includes a hook surface 26*k* extending along a direction across the axis X, which faces and is butted against the edge 4*f* of the latch 4*e* provided in the side of the cage 4. By butting the edge 4*f* of the latch 4*e* against the hook surface 26*k*, the optical module 1 is fixed within the cage and prevented from releasing therefrom. The side wall 28*a* of the lower body 28 has openings to make the latch 4*e* in contact with the projection 26*j* of the upper body 26.

The actuator 20 has a pair of arms 20*a* and a center portion 20*b* connecting respective arms 20*a*. The arm 20*a* is received in the groove 26*i* provided in the side wall 26*a* of the upper body 26. That is, the arm 20*a* of the actuator is set into the groove 26*i* of the upper body 26 and the groove 26*i*, with the arm 20*a* set therein, covered with the lower body. Therefore, the actuator 20 enables to slide only in the direction along the axis X.

The tip portion of the arm 20*a* is forked and the forked slabs 20*c* puts the projection 26*j* in the groove 26*i* therebetween. The forked slabs 20*c* is bent toward the outer side of the optical module such that, when sliding the actuator 20 toward the front side, the forked slab 20*c* is in contact with the latch 4*e* and presses the latch toward the outer side of the optical module 1. In other words, the span between the forked slab in respective arms 20*a* is greater than the length of the center portion 20*b*, accordingly, sliding the actuator with the arms 20*a* in the groove 26*i*, the forked slab presses the latch 4*e* outward and releases the latching between the projection 26*j* and the latch 4*e*.

Figure 5A:
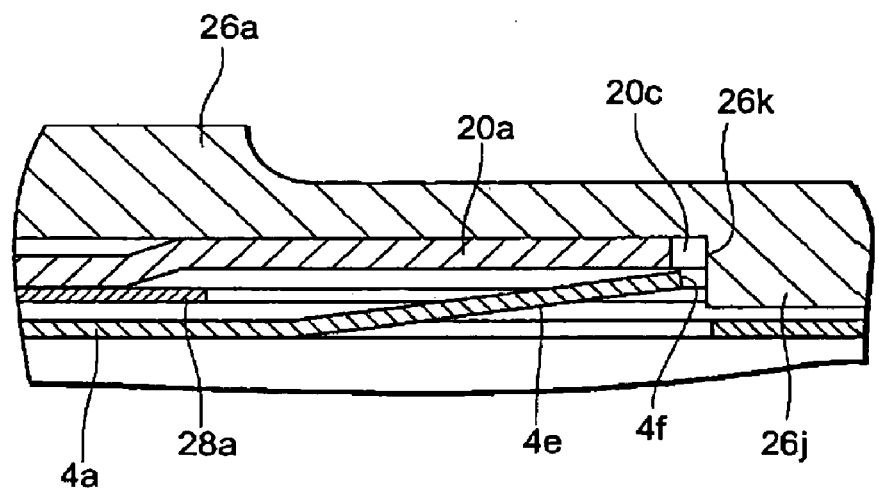
FIG. 5 is a cross sectional view taken of the optical module along the line V—V in FIG. 1.
Figure 5B:
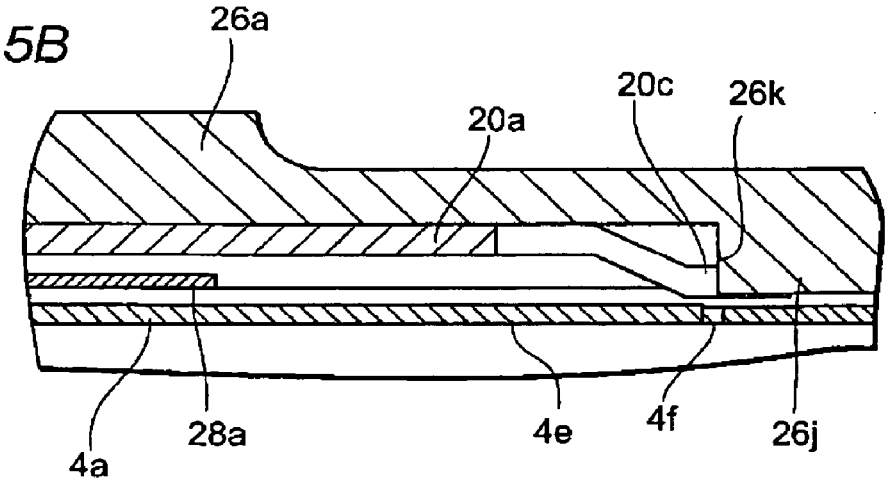

FIG. 6A is a cross sectional view taken along the line V—V in FIG. 1, which shows the state when the optical module 1 is fixed in the cage 4. In this state, the forked slabs 20*c* sandwich the projection 26*j* in the groove 26*i* and positions along the edge 26*m* of the projection 26*j*. While, FIG. 5B shows a state that the optical module 1 is released from the cage 4. Sliding the actuator 28 frontward to release the optical module 1 from the cage 4, the edge 4*f* of the latch 4*e* is pushed out from the position facing to the hook surface 26*k* of the projection 26*i* toward the outer side by the forked slab 20*c*, which enables to release the optical module 1 from the cage 4. In FIG. 5B, the outer side of the optical module 1 corresponds to the downward in FIG. 5A and FIG. 5B.

Figure 6:
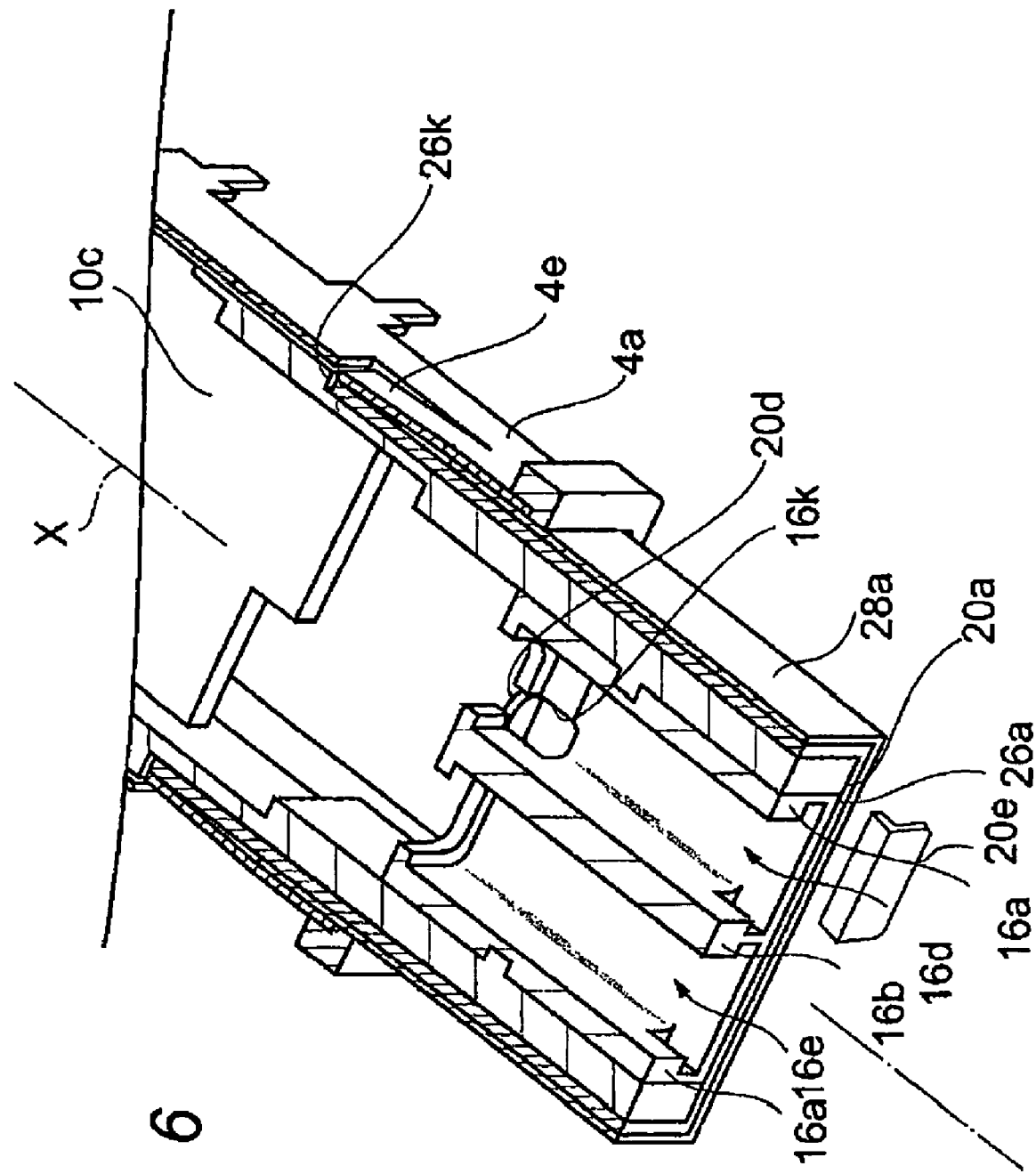
FIG. 6 is a perspective view of the optical module cut along the line VI—VI in FIG. 1.

Referring to FIG. 4 again, in the end portion of the center portion 20*b* of the actuator 20, a flange 20*d* bent upward therefrom is provided. The flange 20*d* protrudes in the receptacles 16*e* and 16*d*. FIG. 6 shows a cross sectional view, taken along the line VI—VI in FIG. 1 and illustrated in perspective, of the front portion of the optical module 1. In the rear end of the bottom 16*c* of the receptacle body 16, a guide opening 16*k* is provided to protrude the flange 20*d* into the receptacles 16*d* and 16*e*. The flange 20*d* is in contact with the outer surface of the connector 24 in the receptacles 16*d* and 16*e*. Therefore, when the connector 24 is inserted into the receptacles 16*d* and 16*e*, and is fixed thereto, the flange 20*d* butts against the optical connector 24, the optical connector is fixed to the receptacle body 16 by hook 24 thereof, thus the actuator 20 can not be pulled out from the optical module 1. The width of the flange 20*d* is preferably smaller than one third of that of the optical connector, because in the receptacle body 16 thus configured, the side walls 16*a*, the partition wall 16*b* and the bottom 16*c* may not reduce in its holding mechanism for the optical connector therein by the existence of the guide opening 16*k*.

The guide opening 16 has a substantial length along the axis X to guide the flange 20*d* from a first position to a second position. The first position corresponds to the edge portion of the receptacle body, and the flange, when the optical connector 24 is inserted in the receptacles 16*d* and 16*e*, slides to the first position. The flange 20*d* is prohibited to slide at the first position by the existence of the optical connector 24. Accordingly, the optical module 1 cannot be released from the cage 4 when the optical connector 24 is installed into the optical receptacles 16*d* and 16*e*.

The second position of the flange 20*d* corresponds to the front end of the guide opening 16*k*. When the actuator slides to the front end and the flange 20*d* moves to the second position, the latch 4*e* of the cage 4 is pushed outward by the forked slabs 20*c* provided in the arm 20*a* of the actuator 20, and the optical module 1 can be released from the cage 4.

Moreover, the actuator 20 has another flange 20*e* bent downward in the front edge of the center portion 20*b* thereof. This flange 20*e* is usable to slide the actuator 20 when the bail, described in detail below, is not provided in the optical module 1.

The side portion 20*a* of the actuator 20 has holes 20*f*. Further, the side wall 28*a* of the lower body 28 may provide slot 28*h* extending along the axis X and communicating with the hole 20*f* of the actuator 20. The shaft 22*a* of the bail 22 is inserted into the hole 20*a* of the actuator 20 via the slot 28*h* of the lower body 28. The bail 20 is usable to pull out the optical module 1 from the cage 4. In the present embodiment shown in FIG. 2, the bail 22 has a grip 22*b* pivotable in the front of the receptacles 16*d* and 16*e*.

When the optical connector 24 mates with the receptacles 16*d* and 16*e*, the grip 22*b* of the bail 22 may pivot in upward or downward. In the present embodiment, the slot 28*h* provided in the lower body 28 continues to another slot 28*i* extending in a direction perpendicular to the axis X. Pivoting the grip 22*b* in upward or downward, the corner portion 22*c* of the bail may mate with the other slot 28*i*.

(Second Embodiment)

Figure 7:
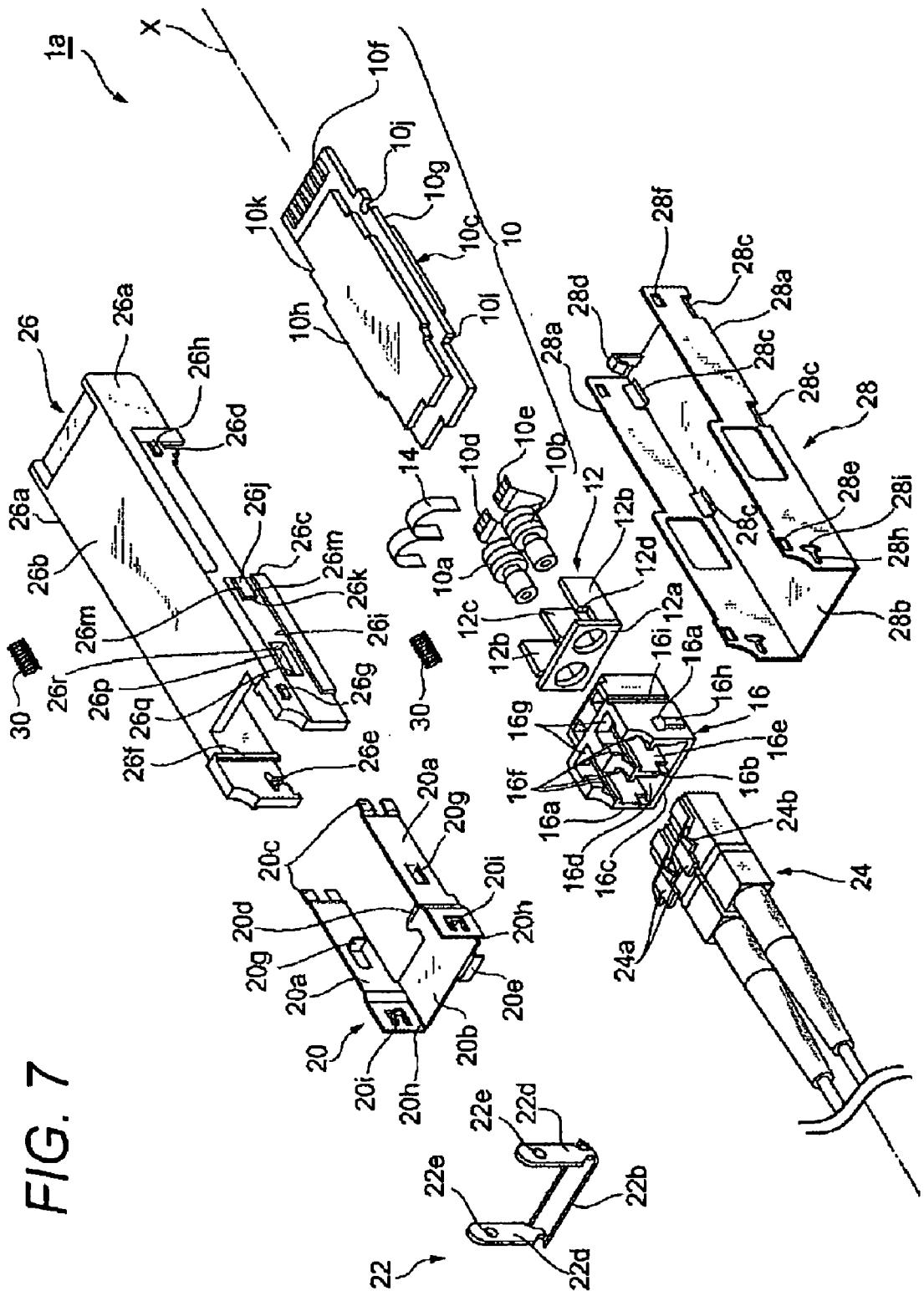
FIG. 7 is an exploded view of the optical module according to the second embodiment of the present invention.

FIG. 7 is an exploded view of an optical module 1*a* according to the present embodiment. The optical module 1*a*, similar to the first embodiment shown in FIG. 4, includes a primary unit 10, a holder 12, a bracket 14, a receptacle body 16, a housing 18, an actuator 20 and a bail 22. In the modified optical module 1*a*, the upper body 26, the actuator 20, and the bail are different to corresponding elements in the first embodiment. Further, the optical module 1*a* of the second embodiment includes a spring 30.

As shown in FIG. 7, the actuator 20 in the arm 20*a* thereof provides a projection 20*i* cut therefrom and bent inward. Between the arm 20*a* and the center portion 20*b* of the actuator 20 is cut by a length from the front edge thereof. Further, the front side walls 20*h* of the actuator 20 is expanded outward with respect to the arm 20*a*.

The bail 22 in the present embodiment also has a grip 22*b* and a pair of arms 22*d* bent from the grip 22*b*, and the hole 22*e* in the arm 22*d*. The bail 22, the arm 22*d* of which passes through the cut provided between the front side wall 20*a* and the center portion 20*b* of the actuator 20, is fixed to the actuator 20 by the projection 20*i* being inserted in the hole 22*e* in the arm 22*d*.

The actuator 20 further provides another flange 20*g* in the arm 20*a*. The other flange 20*g* is cut from the arm 20*a* and bent inward such that the surface of the other flange 20*g* extends along a direction intersecting the axis X. On the other hand, the side wall 26*a* of the upper body 26 further provides another groove 26*p* into which the other flange 20*g* of the actuator is inserted. The other groove 26*p* has a pair of inner surfaces 26*q* and 26*r*, both extending in the direction intersecting the axis X. A spring 30 is inserted between the other flange 20*g* and one of the inner surface 26*q* of the groove 26*p*.

Figure 8:
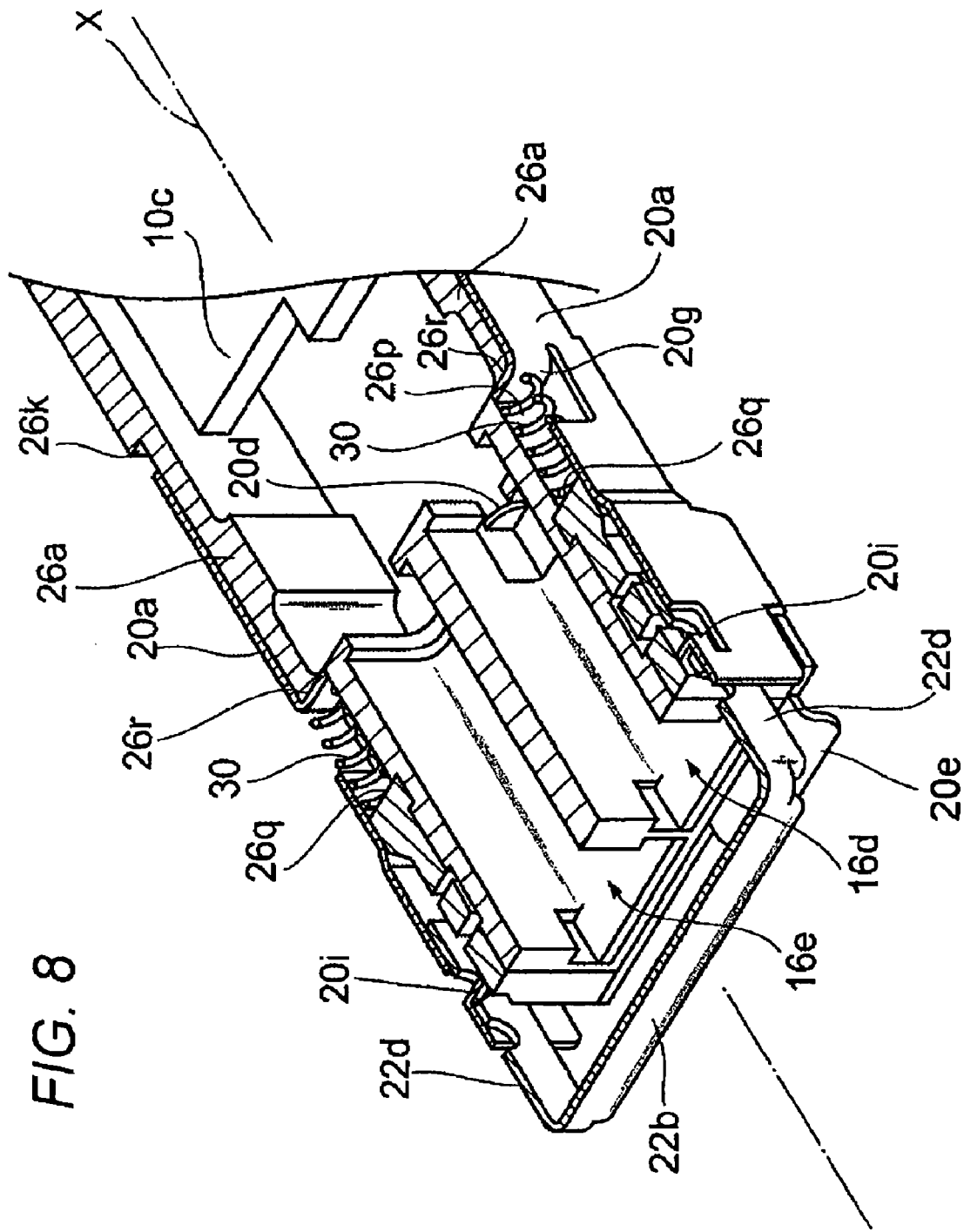
FIG. 8 is a perspective view of the optical module according to the second embodiment showing the actuator pushed rearward by the spring.

FIG. 8 is a cross sectional view of the optical module 1*a* illustrated in perspective, and shows the state when actuator 20 is pushed therein. The spring 30, in the ordinal position, presses the other flange 20*g* to touch the other surface 26*r* of the groove 26*p*, and the flange 20*d*, provided in the center portion 20*b* of the actuator, is set in the first position. That is, the spring 30 normally holds the actuator 20 in the position such that the latch 4*e* of the cage 4 may not release from the projection in the upper body.

Figure 9:
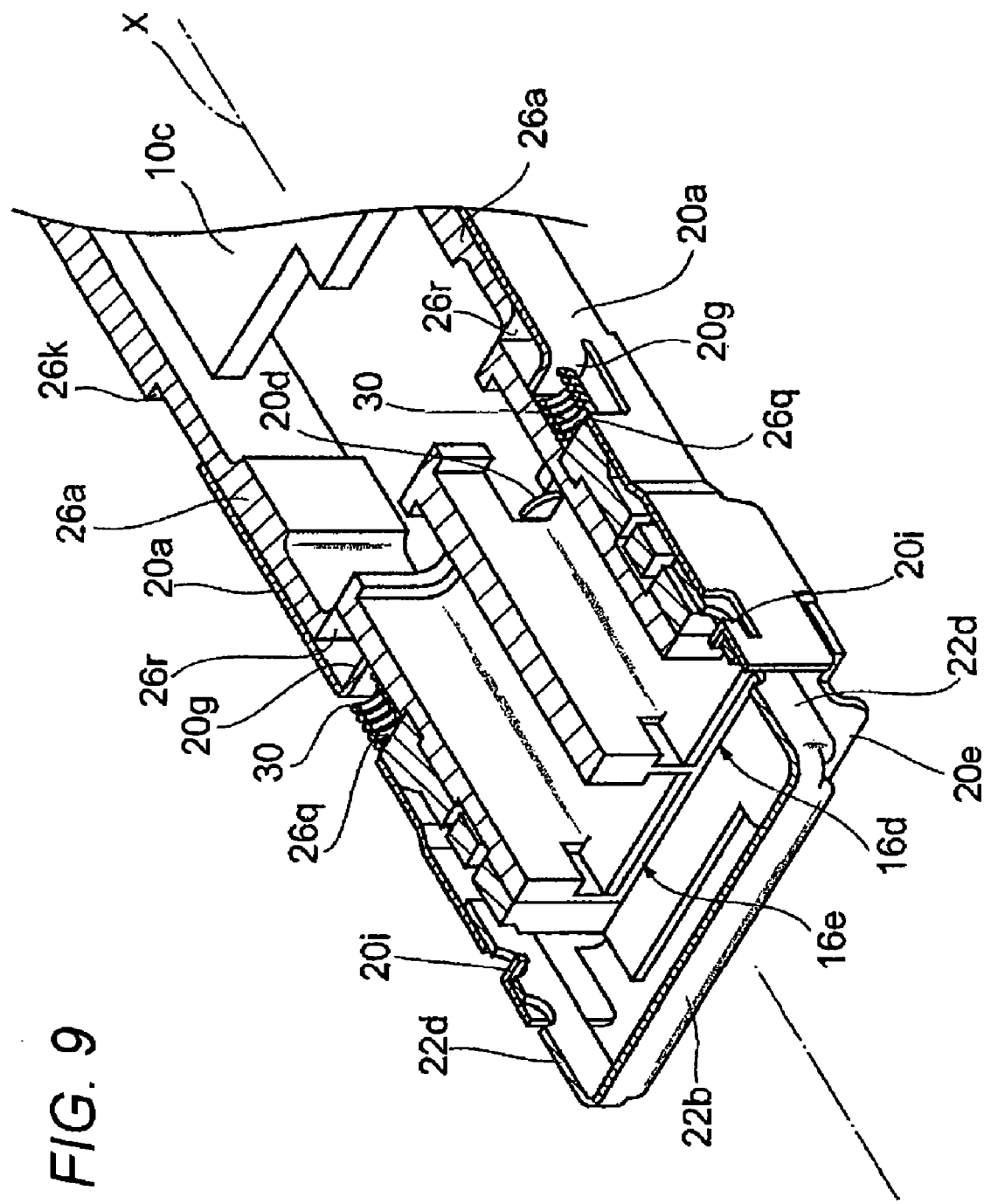
FIG. 9 is a perspective view of the optical module according to the second embodiment showing the actuator pulled frontward.

FIG. 9 is also a partially cut perspective view showing the state that the actuator 20 is pulled out. The spring is shrank by the flange 20*g*, and the latch 4*e* of the cage 4 is released from the projection 26*j* of the upper body 26. Even when the actuator is pulled out, since the side wall 28*a* of the lower body 28 covers the groove 26*p* of the upper body, the spring 30 does not bound out from the groove 26*p*.

Thus, the optical module 1*a* of the present embodiment, even when the optical connector does not exist in the optical receptacles 16*d* and 16*e*, the optical module 1*a* is fixed to the cage 4, because the spring 30 forces the actuator 20 to the first position not to release the optical module 1*a* from the cage 4. Therefore, as long as an external force to shrink the spring is not operated, the optical module 1*a* can not release from the cage 4.

In figures from FIG. 7 to FIG. 9, the bail 22 is set inside of the actuator 20, and, when the actuator 20 is in the first position at which the optical module 1*a* is latched to the cage 4, the bail 22 is set in one of the upward and the downward position relative to the optical module 1*a*.

(Third Embodiment)

Figure 10:
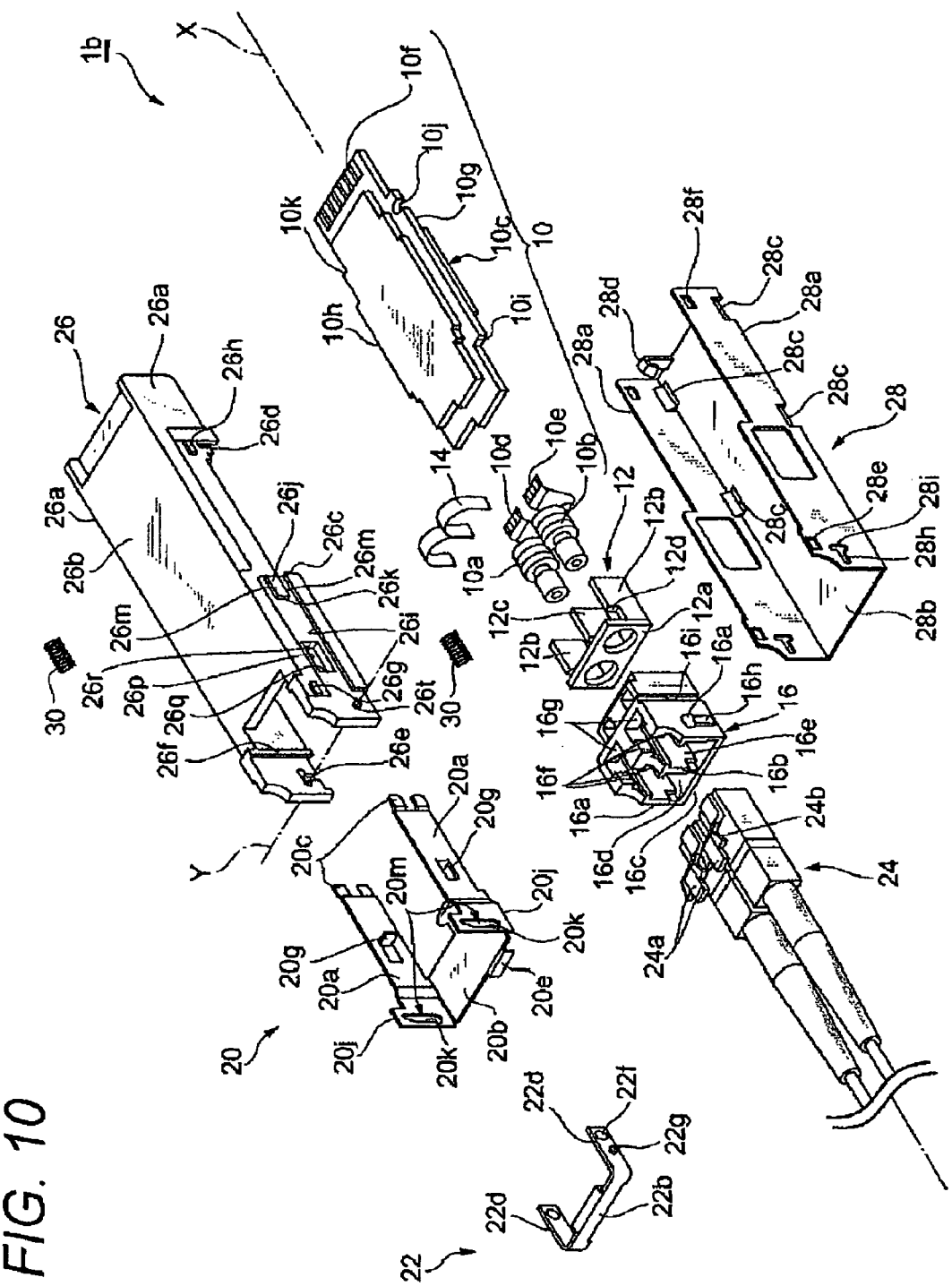
FIG. 10 is an exploded view of the optical module according to the third embodiment of the present invention.

FIG. 10 is an exploded view showing an optical module 1*b* according to the third embodiment of the present invention. The optical module 1*b*, similar to the optical module 1*a* of the second embodiment, includes a primary unit 10, a holder 12, a bracket 14, a receptacle body 16, a housing 18, an actuator 20, a bail 22, and a spring 30. In the present optical module 1*b*, the arrangement of the upper body 26, the actuator 20, and the bail are different to those contained in the optical module 1*a* of the second embodiment.

As shown in FIG. 10, the thickness of the side wall 20*a* in the front end portion of the upper body 20 is formed thin to coincide with the bottom surface of the groove 20*i*. Further, in the front end portion of the side wall 10*a* provides a pair of projections 26*t* extending along another axis Y.

The leg portion 22*d* of the bail 22 provides a hole 22*f* and a projection 22*g*, both extending along the axis Y. The bail 22 is able to pivot around the projection 26*t*, namely around the axis Y, by inserting the projection into the hole 22*f* of the leg portion 22*d*.

The actuator 20 in the present embodiment provides a slot 20*m* in the front end portion 20*j* thereof, the inner surface 20*k* of which becomes a sliding surface. That is, the projection 22*g* provided in the bail 22, inserting into the slot 20*m*, slides on the inner surface of the slot 20*m* as the bail 22 pivots around the axis Y, and moves the actuator 20 with respect to the upper body 26.

Figure 11:
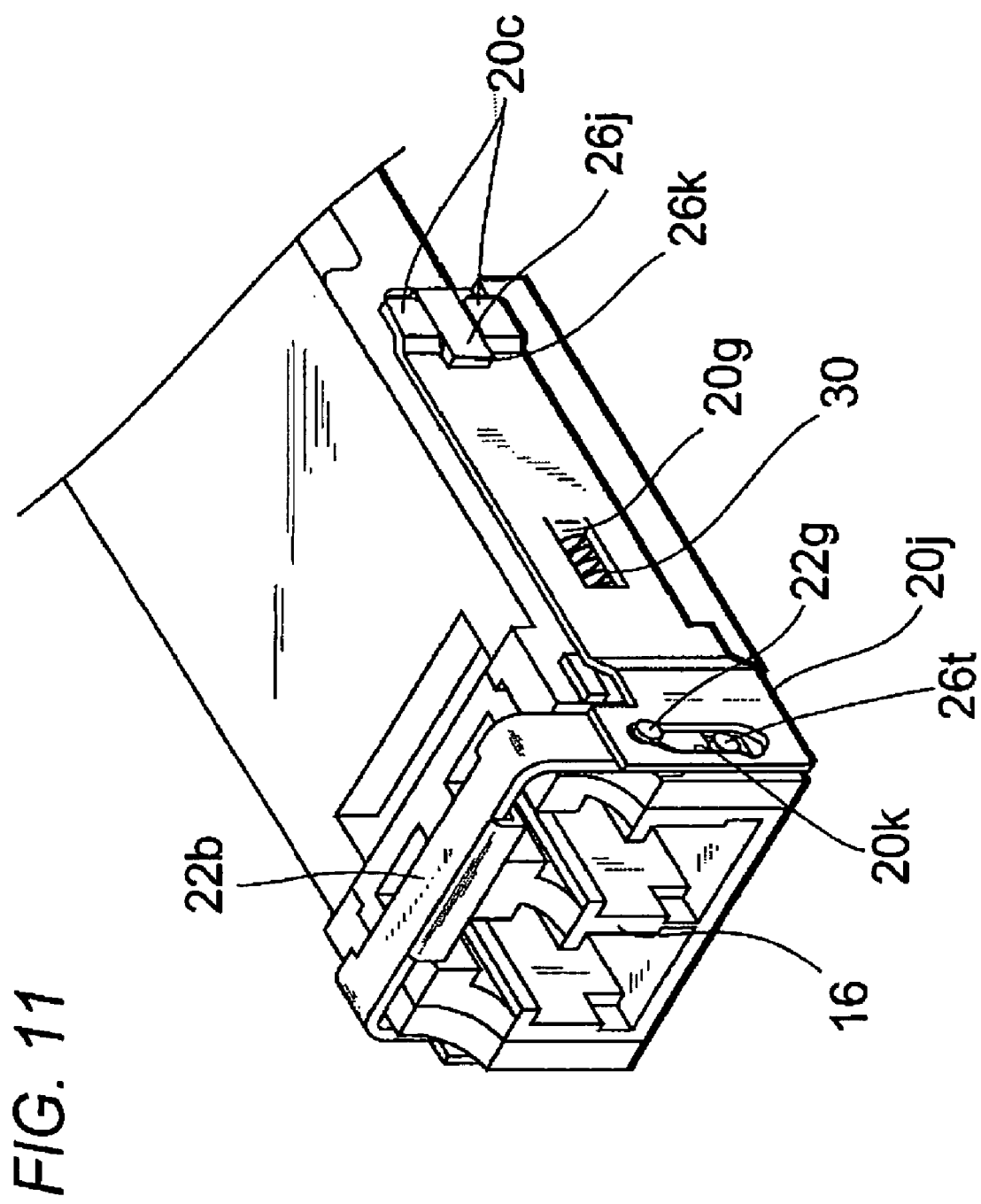
FIG. 11 is an enlarged view of the front portion of the optical module according to the third embodiment, in which the bail is positioned where the actuator is set in the first position.
Figure 12:
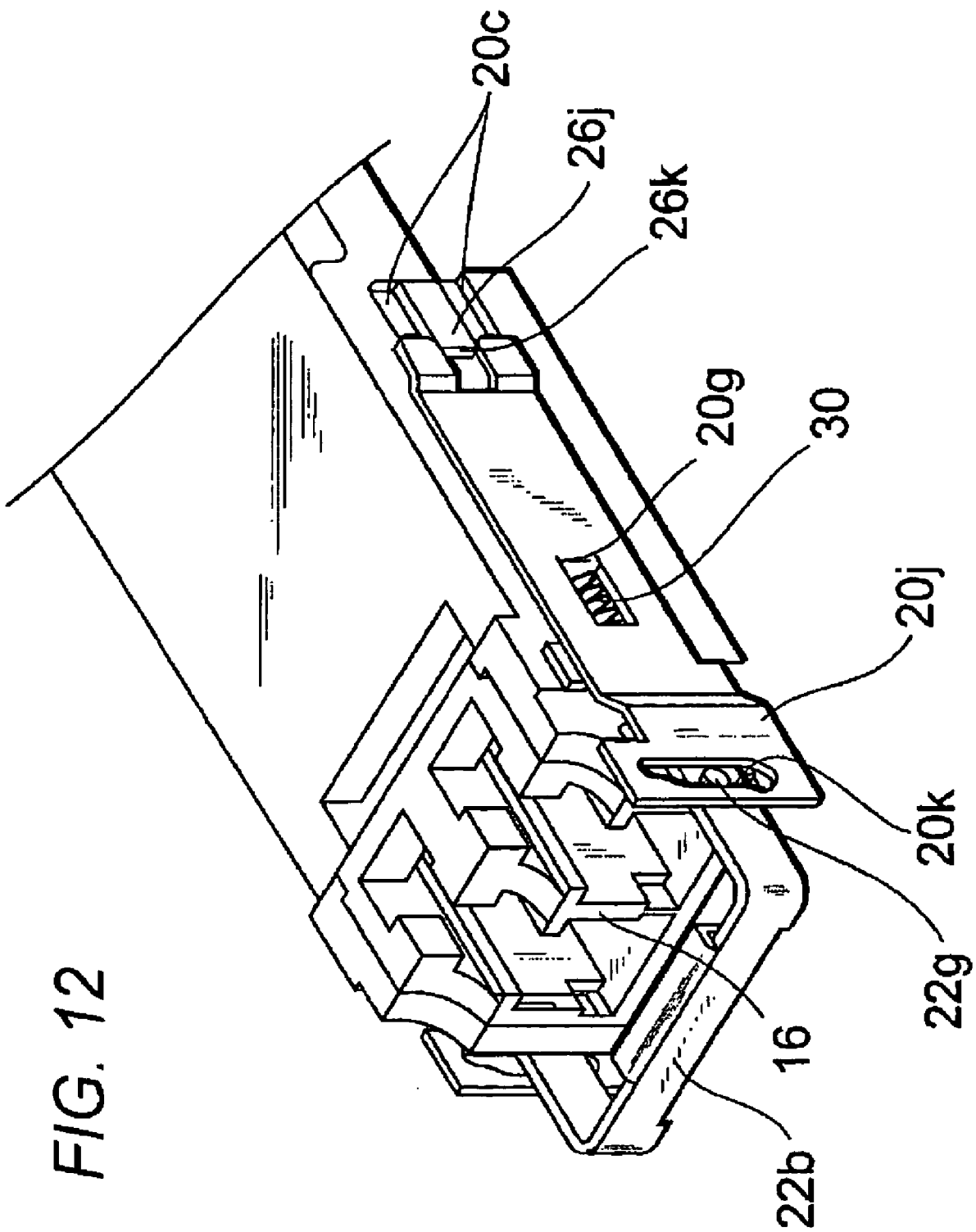
FIG. 12 is an enlarged view of the front portion of the optical module according to the third embodiment, in which the bail is positioned where the actuator is set in the second position.

FIG. 11 shows a positional relation ship between the actuator 20 and the bail 22 when the optical module 1*b* is latched with the cage 4, while FIG. 12 shows the relation ship when the optical module 1*b* is in the released state. In these figures, the lower body 28 is not shown.

The flange 20*g* of the actuator 20 is pressed in backward by the spring 30, accordingly, the forked slab 20*c* provided in the edge of the arm 20*a* of the actuator 20 is set in the lock position. In this state, the projection 22*g* provided in the leg portion of the bail 22 is slid to the top of the slot 20*m*, and the grip 22*b* of the bail 22 is set in the upward position relative to the receptacle body 16.

On the other hand, pivoting the bail around the axis Y, the projection 22*g* slides on the inner surface 20*k* of the slot 20*m* and moves to the front position as shown in FIG. 12. The stroke length of the bail 22 by pivoting corresponds to the length to slide the forked slab 20*c* from the position where the latch 4*e* of the cage 4 faces to the projection 26*j*, the first position, to the releasing position, namely, the second position.

In FIG. 11, although the bail 22 is set in the upward position when the optical module 1*b* is latched to the cage 4, the bail 22 may be set in the downward position, that is, the projection 22*g* positions in the bottom of the slot 20*m*. The projection 26*t* provided in the side wall 26*a* of the upper body vertically positions nearly in the middle of the upper body 26, accordingly, the bail 22 may be set in the upward or the downward position when the optical module 1*b* is in the latched state.

Thus, in the optical module 1*b*, pivoting the bail 22 may slide the forked slab 20*s* from/to the position where the optical module latches with or release from the cage 4. Further, since the actuator 20 is pressed by the spring, the bail 22 is automatically positioned where the latch 4*e* of the cage 4 faces to the projection 26*c* provided in the side wall 26*a* of the upper body 26.

Thus, the bail 22 is provided in the optical module 1, and the bail 22 may be set in upward and downward position when the optical connector mates with the receptacle 16.

Therefore, the optical module 1 can be installed in a pile-up configuration.

Although the optical module 1b provides the projection 26t in the upper body and the hole in the bail 22, it may be applicable that the hole and the projection are respectively provided in the opposite element, namely, the hole in the upper body and the projection in the leg portion of the bail.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. An optical module for communicating with an optical connector, said optical module being plugged in a space formed by a plurality of walls of a cage mounted on a host board, at least one of said walls of said cage including a resilient latch protruding into said space, comprising:
   an optical sub-assembly including an optical device therein;
   a housing providing a projection butting against an edge of said resilient latch when said optical module is plugged in said cage;
   a receptacle body having one end and another end, said one end including a receptacle for mating with said optical connector and said other end installing said optical sub-assembly, said receptacle body further including an opening; and
   an actuator slidable between a first position and a second position, said actuator including a pair of arms and a center portion connecting said arms, a span between said arms being longer than a length of said center portion, said center portion including a flange to be inserted into said opening of said receptacle body, said actuator pressing said resilient latch of the cage outward from said space at said second position,
   wherein said optical module is disengaged from said cage by sliding said actuator from said first position to said second position, and
   wherein said actuator is, when said optical connector is mated with said receptacle body, unable to slide from said first position to said second position by butting said flange against said optical connector inserted into said receptacle body.

2. The optical module according to claim 1, wherein said housing has a groove for receiving said arm of said actuator, said arm of said actuator being slidable in said groove.

3. The optical module according to claim 2, wherein an end portion of said arm of said actuator is forked and said projection provided in said housing is disposed within said groove, said projection being put between said forked end portions of said actuator in said groove.

4. The optical module according to claim 2, wherein said housing comprises an upper body including a pair of side walls and a lower body including a pair of side walls, said side walls of said upper body disposing said groove and said projection, said side walls of said lower body providing an opening and covering said side walls of said upper body, said resilient latch of said cage being butted against said projection by extending through said opening provided in said side walls of said lower body, and
   wherein said arm of said actuator is disposed between said side wall of said upper body and said side wall of said lower body.

5. The optical module according to claim 1, further including a bail connected to said actuator for sliding said actuator.

6. The optical module according to claim 5, wherein said bail is set in an upward position and in a downward position relative to said optical module when said actuator is set in said first position.

7. The optical module according to claim 5, wherein said housing comprises an upper body and a lower body, said bail being coupled to said actuator via said lower body.

8. The optical module according to claim 5, wherein said lower body includes a slot through which said bail passes to couple to said actuator, and
   wherein said first position of said actuator corresponds to a position where said bail is in one end of said slot, and said second position of said actuator corresponds to a position where said bail is in another end of said slot.

9. The optical module according to claim 5, wherein said actuator further includes a pair of front side walls each extending from said arms, and
   wherein a span between said front side walls is greater than a length of said center portion, said bail being positioned inside of said front side walls of said actuator.

* * * * *